(12) United States Patent
Weitzel

(10) Patent No.: US 7,826,062 B2
(45) Date of Patent: Nov. 2, 2010

(54) DEVICE TO DETECT OR GENERATE OPTICAL SIGNALS

(75) Inventor: Thilo Weitzel, Tübingen (DE)

(73) Assignee: Campus Technologies AG, Zug (CH)

( * ) Notice: Subject to any disclaimer, the term of this patent is extended or adjusted under 35 U.S.C. 154(b) by 0 days.

(21) Appl. No.: 11/825,974

(22) Filed: Jul. 9, 2007

(65) Prior Publication Data
US 2008/0152349 A1     Jun. 26, 2008

Related U.S. Application Data

(63) Continuation of application No. 09/232,119, filed on Jan. 15, 1999, now Pat. No. 7,257,334.

(30) Foreign Application Priority Data

Jan. 16, 1998   (DE) ................. 198 01 469

(51) Int. Cl.
*G01B 9/02*     (2006.01)
(52) U.S. Cl. ..................................... 356/498
(58) Field of Classification Search ................. 356/484, 356/489, 450, 455, 488
See application file for complete search history.

(56) References Cited

U.S. PATENT DOCUMENTS

| | | | |
|---|---|---|---|
| 2,151,631 A | 3/1939 | Williams | 356/450 |
| 3,469,923 A | 9/1969 | Mertz | 356/451 |
| 3,482,919 A | 12/1969 | Barringer | 356/455 |
| 4,190,366 A | 2/1980 | Doyle | 356/455 |
| 4,533,247 A | 8/1985 | Epworth | 356/479 |
| 5,059,027 A | 10/1991 | Roesler et al. | |
| 5,073,331 A | 12/1991 | Shirasaki | 372/26 |
| 5,313,266 A | 5/1994 | Keolian et al. | |
| 5,349,440 A * | 9/1994 | DeGroot | 356/489 |
| 5,351,124 A | 9/1994 | Laskoskie et al. | 356/477 |
| 5,412,474 A | 5/1995 | Reasenberg et al. | 356/486 |
| 5,636,195 A | 6/1997 | Saikan et al. | 369/100 |
| 5,847,828 A | 12/1998 | Downs | 356/451 |
| 5,991,062 A | 11/1999 | Fischer et al. | 359/191 |
| 6,091,522 A | 7/2000 | Snawerdt, III et al. | 359/191 |
| 6,104,517 A | 8/2000 | Blodgett et al. | 398/201 |
| 6,115,121 A | 9/2000 | Erskine | 356/450 |
| 6,297,884 B1 * | 10/2001 | Drabarek | 356/489 |

FOREIGN PATENT DOCUMENTS

| | | |
|---|---|---|
| DE | 3820170 | 12/1989 |
| EP | 0297556 | 1/1989 |

OTHER PUBLICATIONS

Patent abstracts of Japan No. 04055726, Feb. 24, 1992 and JP 02165566.
Hecht, E. and A. Zajac. Optics. Reading, Massachusetts: Addison Wesley Publishing Company, Inc., 1974. p. 37-38, 62-65, 189-190, 286-290.

* cited by examiner

*Primary Examiner*—Gregory J Toatley, Jr.
*Assistant Examiner*—Scott M Richey
(74) *Attorney, Agent, or Firm*—Dilworth & Barrese LLP

(57) ABSTRACT

The present invention relates to a device for detecting or generating and modulating optical signals, and having an angular dispersive element arranged to change angles of the optical signals or carrier and/or reference rays brought to interference.

16 Claims, 5 Drawing Sheets

DEVICE TO DETECT OR GENERATE OPTICAL SIGNALS

CROSS REFERENCE TO RELATED APPLICATION(S)

This is a continuation of application Ser. No. 09/232,119 filed Jan. 15, 1999 and now U.S. Pat. No. 7,257,334.

BACKGROUND OF THE INVENTION

The present invention relates to a device to detect optical signals with means to generate at least one reference light ray which has frequency shift and/or frequency modulation or phase shift and/or phase modulation and/or time displacement over the optical signal to be detected, with means with which the optical signal to be detected and/or the reference light ray(s) can be aligned in such a way that they can be brought into interference and with at least one detector with a demodulator by means of which amplitude modulation can be detected.

The invention further relates to a device to generate optical signals by means of modulation of optical carriers with means to generate at least one reference light ray which has frequency shift and/or frequency modulation or phase shift and/or phase modulation and/or time displacement over the optical carrier to be modulated, with means with which the optical signal to be detected and/or the reference light rays can be aligned in such a way that they can be brought into interference and with at least one coupler by means of which the resulting interference signal can be coupled out.

The invention further relates to the use of a device in accordance with the invention as an optical receiver or an optical modulator or as a spectrometer.

The optical information transfer is based on different methods which are each based on the modulation of certain properties of the optical carrier wave. When a laser is used as the light source, information can be effected by time modulation of the amplitude, the frequency, the phase or the polarization of the light source, with a modulation of the polarization only being used in special cases due to technical difficulties in the transfer in optical fibers. The essential element of such methods for optical information transfer is the optical receiver which must be capable of recognizing the relevant modulation within a very short time event at a very low intensity of the signal received.

The simplest method (direct detection) comprises the measurement of the intensity of the incident optical carrier. Accordingly, only a modulation of the intensity, i.e. amplitude modulation (amplitude shift keying, ASK) can be used as the modulation method. In addition, a very strong modulation of the frequency of the optical carrier can be detected by the receiver with the aid of one or more suitable optical filters directly as amplitude modulation, too.

The modulation forms of phase and frequency modulation require the overlapping in the receiver of the incident optical signal to be detected with a local reference light source (local oscillator, LO). Here, a difference is made between homodyne detection and heterodyne detection, with the reference light source possessing the same frequency as the optical signal to be detected in the first case and a different frequency in the second case. In the so-called quasi-heterodyne detection method, only the phase position of the reference light source is varied. The overlapping of optical signal and light of the reference light source leads to an interference signal from which, depending on the arrangement, the amplitude and phase or frequency of the signal to be detected can be derived with reference to the local reference source.

Furthermore, a difference is made between coherent (coherent detection) and non-coherent (non-coherent detection) receivers. While with coherent detection, the modulation of the interference signal is evaluated with amplitude and phase position, with non-coherent detection, only the intensity of the modulation is detected, i.e., in this case, the envelope curve of the interference signal is observed. In the case of coherent detection, the local reference source must be stabilized according to frequency and phase position and must track the incident optical carrier, while with the non-coherent detection, a control of the frequency of the local reference light source is sufficient.

The homodyne detection allows the measurement of the phase and thus of the phase modulation (phase shift keying, PSK) of the optical carrier wave; heterodyne detection also allows the detection of phase jumps in the optical carrier wave (differential phase shift keying, DPSK). The heterodyne detection is also used for the detection of a frequency modulation (frequency shift keying, FSK). In this case, the different frequencies can be detected electronically in the interference signal. Both the direct detection (ASK) and the heterodyne methods can transfer several sub-carriers modulated up in the radio wave range (sub-carrier modulation (SCM). The SCM methods are gaining in significance as the bandwidth of the feasible signal connections increases since a single optical channel can be used for several independent data streams.

The following are just some of the possibilities:
Direct detection: ASK
Heterodyne, non-coherent detection: ASK, FSK, DPSK
Heterodyne, coherent detection: ASK, FSK, PSK
Homodyne, coherent detection: ASK, PSK The bandwidth of the signal which can be transferred and also the technical effort grow in accordance with this list. On the receiver side, coherent detection, in particular homodyne coherent detection, means a high technical effort due to the required stabilization of the local reference light source.

To cover the range between bandwidths which can still be handled and processed electronically (<GHz) and the transfer capacity of the optical systems, several optical carriers of different wavelengths can be used which use the optical system together, but which are used individually by independent transmitters/receivers. If a sufficiently high wavelength selectivity can be achieved, this wavelength division multiplexing procedure (WDM) allows the selection of a bandwidth for the modulation of the individual optical carriers suitable for the corresponding application and technology without essentially restricting the transfer capacity of the optical system (high density wavelength division multiplexing or hd WDM). One particularly interesting application field is represented by optical multi-channel networks as the ability of the receiver to select a single channel leads to a substantial simplification of the distribution nodes in the network (tunable channel, multi-access networks or TCMA).

The physical connection between the size of an optical element and its maximum possible spectral resolution does not allow spatially small elements a spectral resolution in the GHz range. While homodyne and heterodyne detection with a local reference light source allow a very high spectral resolution, the control of the reference light source requires a high technical effort.

SUMMARY OF THE INVENTION

It is therefore the object of the present invention to further develop a generic device to detect or generate optical signals in such a way that it possesses a high spectral resolution even when relatively small optical elements are used and the wavelength of the optical carrier to be received or modulated should be freely selectable without great technical effort being created for the control of a local reference light source.

This object is solved in accordance with the invention by at least one wavelength-dependent element being provided by means of which the angle(s) of the light rays brought to interference can be changed in dependence on the wavelength and by at least one of the detectors being designed in such a way or being in combination with a demodulator and/or with optical elements in such a way that a time and/or spatial modulation of the intensity with reference to the whole or parts of the detected ray cross-section can be measured.

If, in the otherwise unchanged device, instead of the (or at least one of the) detector(s), a coupler is inserted, the device can be used to generate optical signals by modulation of optical carriers and thus as a modulator. Based on a generic device to generate optical signal by modulation of optical carriers, the basic object is solved by at least one wavelength-dependent element being provided by means of which the angle(s) of the light rays brought to interference can be changed in dependence on the wavelength and by at least one of the couplers being designed in such a way that the coupled out signal is dependent on the time and/or spatial modulation of the intensity with reference to the whole or parts of the ray cross-section detected.

In accordance with a preferred embodiment of the present invention, the means to generate at least one reference light ray, which has frequency shift and/or frequency modulation or phase shift and/or phase modulation and/or time displacement over the optical signal to be detected, includes a beam splitter and a frequency shifter and/or frequency modulator or a phase shifter and/or phase modulator and/or a travel distance. This embodiment is advantageous as a local light source can be dispensed with. By dispensing with the local oscillator, the arrangement becomes technically substantially simpler, but nevertheless allows a high spectral resolution.

The means to generate at least one reference light ray which has frequency shift and/or frequency modulation or phase shift and/or phase modulation and/or time displacement over the optical signal to be detected, can include a local light source.

In another embodiment of the present invention, it is provided that at least one of the wavelength-dependent elements includes a diffracting optical element, in particular an optical grating, a hologram or a system of thin films.

At least one of the wavelength-dependent elements can include a dispersing optical element, in particular a prism.

It is especially advantageous, if the (or at least one of the) wavelength-dependent element(s) is designed as a bean splitter or combiner.

In accordance with one preferred element of the present invention, at least one of the wavelength-dependent elements is designed in such a way that the type or degree of dependence of the angle deflection can be changed by the wavelength. In particular, a design as an acousto-optical modulator is possible.

The wavelength-dependent element can simultaneously be designed as a frequency shifter and/or frequency modulator or phase shifter and/or modulator. One or more of the wavelength-dependent elements can be designed as an acousto-optical modulator.

It is particularly advantageous if means are provided by means of which the reference light ray and/or the optical signal can be deflected.

Furthermore, at least one of the wavelength-dependent elements can be positioned in a rotating and/or swivel manner. With embodiment variations which can be derived from a device in accordance with means for generating at least one reference light ray, which has frequency shift and/or frequency modulation or phase shift and/or phase modulation and/or time displacement over the optical signal to be detected, including a beam splitter and a frequency shifter and/or frequency modulator or a phase shifter and/or phase modulator and/or travel distance, the wavelength of the signal to be demodulated can be freely set by adjusting the geometry. In particular, it is possible in various variations of the device to select the wavelength by a simple turning of one of the optical elements.

In another embodiment of the present invention, at least one multiplex hologram is provided and/or other optical elements by means of which multiple rays can be handled simultaneously. By using multiplex holograms, reception can be performed simultaneously on multiple channels, if necessary with the aid of additional detectors.

In accordance with a preferred embodiment of the present invention, parts of the device are provided in multiple and/or multiple rays can be handled by parts of the devices named.

It is especially advantageous if means to change the ray cross-section of at least one of the rays involved are provided. In this case, the incident ray does not necessarily have to be expanded prior to entering the apparatus. Depending on the arrangement of the dispersing or diffracting elements, the ray expansion can be performed at different points, also inside the device. The spectral resolution of the apparatus increases with the ray diameter, in particular with the ray diameter in the plane of the angle deflection of the wavelength-dependent elements.

In another embodiment of the present invention, means can be provided for the spectral filtration or spatial modulation of phase or amplitude of at least one of the rays involved. A suitable definition of the ray profile can further improve the spectral resolution.

It is particularly advantageous if all or one part of the rays involved are directed wholly or partially through waveguides and/or if all or one part of the optical elements are formed by means of the integrated optical system.

The invention relates further to the use of a device in accordance with the invention as the optical receiver or optical modulator or as the spectrometer. The use as the spectrometer is based on the wavelength selectivity of the device in accordance with the invention.

BRIEF DESCRIPTION OF THE DRAWINGS

Further details and advantages of the device in accordance with the invention are explained in more detail by embodiments shown in the drawings, wherein.

DESCRIPTION OF THE PREFERRED EMBODIMENTS

The functional principle of the present invention is based on the fact that the information transferred by the incident light ray (optical signal to be detected) or by the coupled out light ray (modulated optical carrier) is represented exclusively by time modulation of amplitude, wavelength or relative phase position. The angles of incidence or emergence of the rays do not carry any information, but are, in contrast, as a rule kept constant. Furthermore, the rays do not carry any spatial modulation.

The device in accordance with the invention transmits the spectral properties of the suitably expanded incident light ray in the angle space. The different angle components can now be imagined by interference with a suitably generated reference ray to a spatial modulation, with the different angle components showing a characteristic interference pattern in each case. By means of a heterodyne or quasi-heterodyne procedure, interference patterns matching certain angle components can be detected with high selectivity and sensitivity.

Unlike standard spectrometers with dispersing or diffracting elements, with this new method the different spectral components do not have to be separated spatially for detection.

By way of illustration, FIG. 1 shows the resulting spatial and time modulation of the intensity at the site of one of the detectors for a simple arrangement with flat waves. If the device is adjusted to the wavelength of the incident light ray, the period of the spatial modulation of the interference pattern occurring at the detector is very large. In particular, the spatial period of this interference pattern can become larger than the ray cross-section detected by the detector. FIGS. 1a) and 1b) show this situation for two points of time with relative phase positions of the partial rays being different by π. The marked region at the center of the interference pattern shown represents the range of the rays detected by the detector.

Figure 1A:
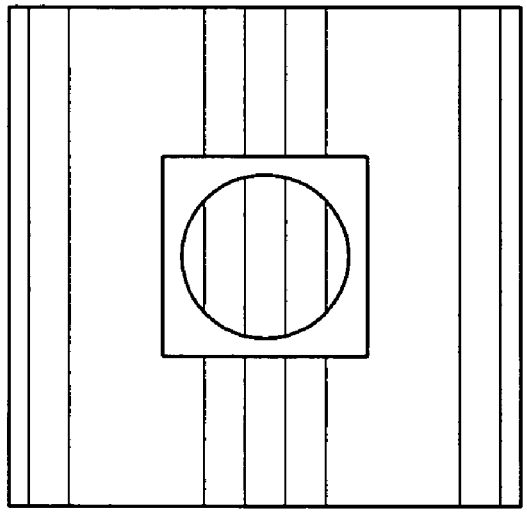
FIG. 1: shows the spatial and time modulation of the intensity at the location of a detector.
Figure 1B:
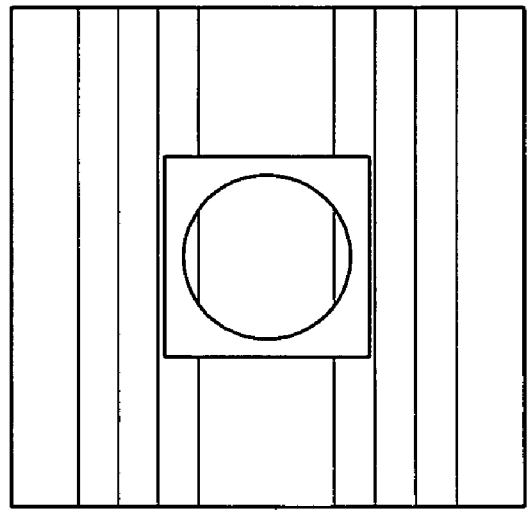
Figure 1C:
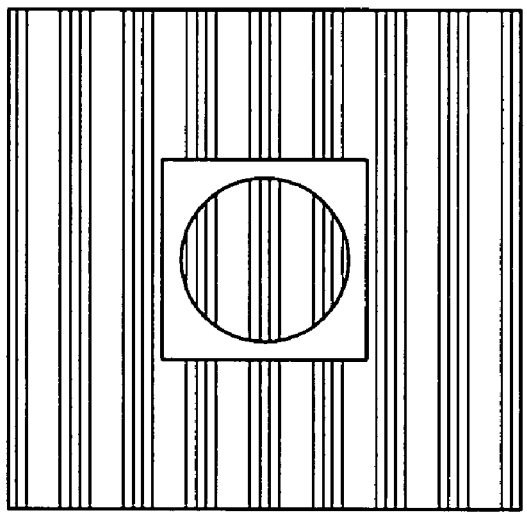
Figure 1D:
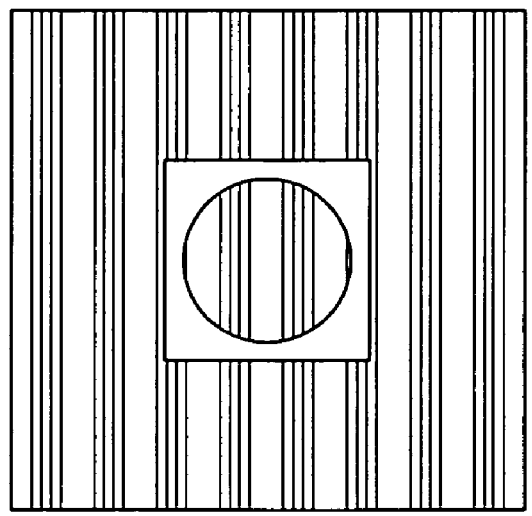

Any change in the relative phase position of the partial rays leads to a lateral shift in the interference pattern. In the situation shown, this leads to a very high time modulation of the intensity integrated over the area detected. Even very small differences in the wavelength of the incident light ray lead to a great shortening of the period of the interference pattern in each case. FIGS. 1c) and 1d) show such a situation for two points of time with relative phase positions of the partial rays differing by Π. The area detected by the detector overlaps several light and dark strips. As the number of strips increases, the time modulation of the interference signal integrated over the area detected which can be measured for a lateral shift of the interference pattern fall rapidly.

Figure 2:
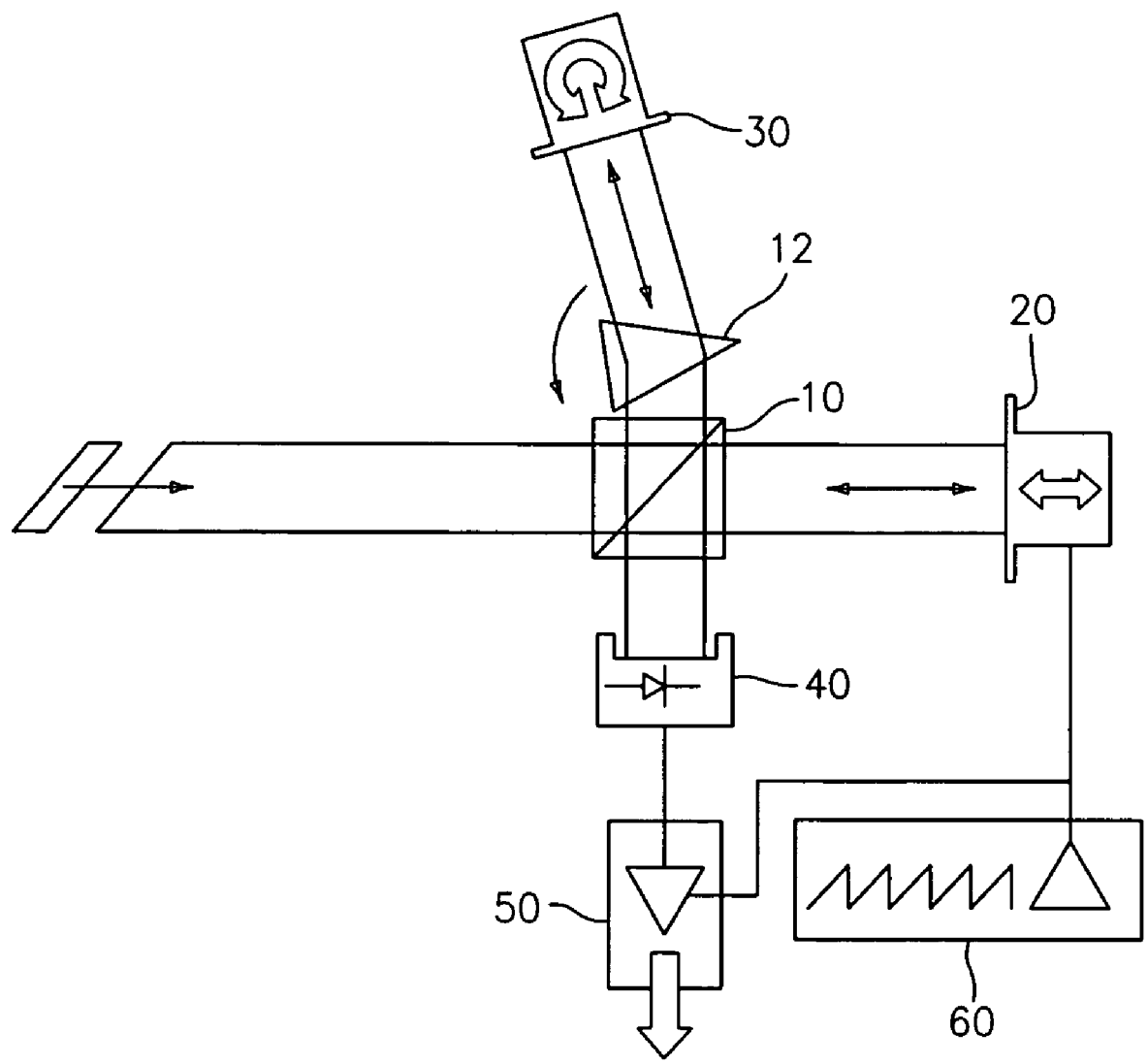
FIG. 2: shows a principle design of a device in accordance with the invention using the ray path of a Michelson interferometer.

FIG. 2 shows the principle design of a simple embodiment of a device in accordance with the invention using the ray path of a Michelson interferometer with the beam splitter 10. A prism 12 is used as the wavelength-dependent element. One of the mirrors 20 forms, by suitable means to shift this mirror, a phase modulator, the other mirror 30 is pivoted in a suitable manner to select the wavelength to be detected. The detector 40 has an areal design and integrates the intensity over the whole cross-section of the ray detected. A lock-in amplifier is used as the demodulator 50. To control the mirror 20 designed as a phase modulator, the modulator control 60 is used.

Figure 3:
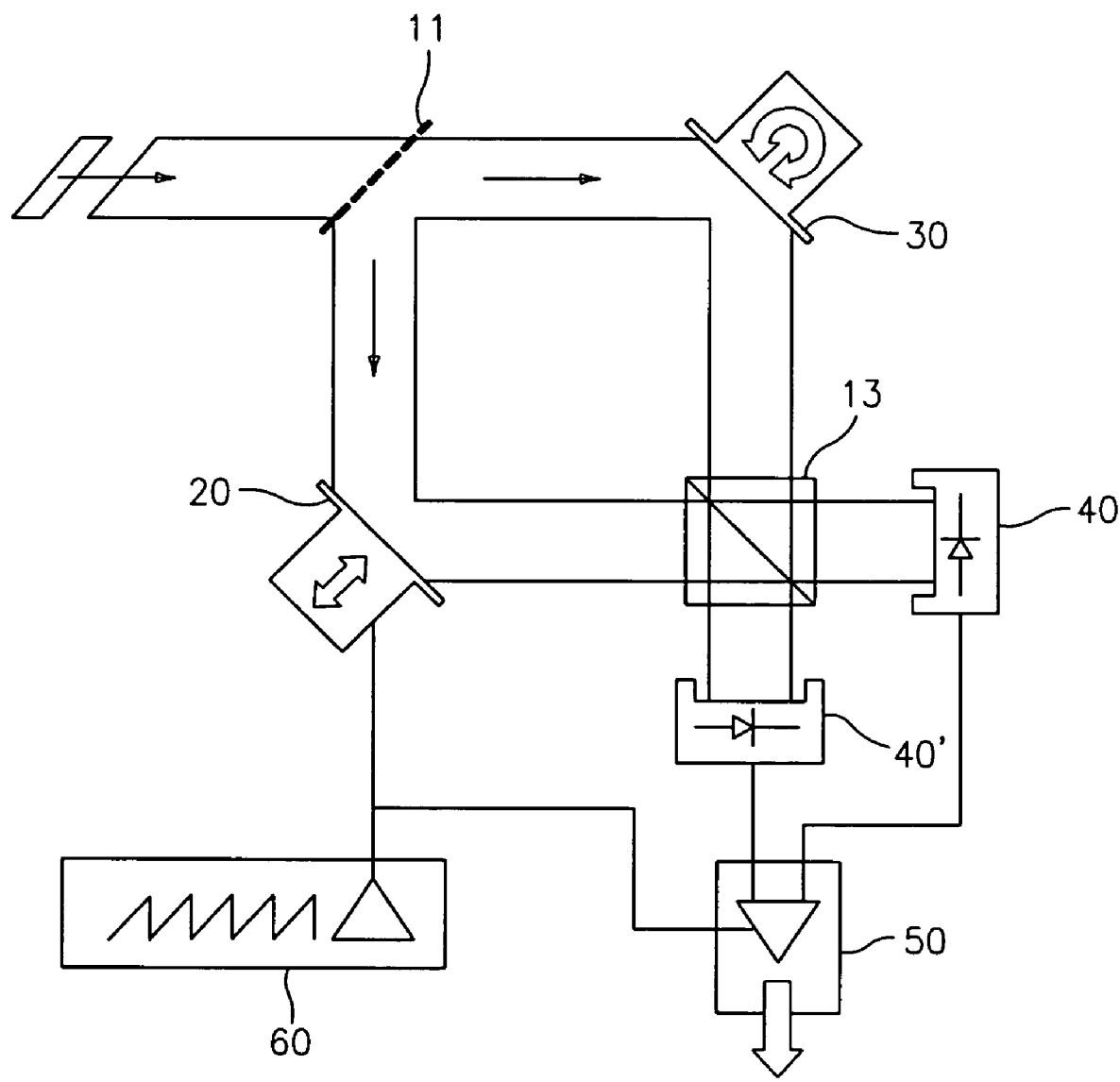
FIG. 3 shows a principle design of a device in accordance with the invention using the ray path of a Mach-Zehnder interferometer.

FIG. 3 shows the principle design of a simple embodiment of a device in accordance with the invention using the ray path of a Mach-Zehnder interferometer. The first beam splitter 11 is designed as a diffracting optical element and so itself forms the wavelength-dependent element. One of the mirrors 20 forms, by suitable means to shift this mirror 20, a phase modulator; the other mirror 30 is pivoted in a suitable manner to select the wavelength to be detected. The partial rays brought to interference by the second beam splitter 13 (combiner) are detected by two detectors 40,40'. The detectors 40, 40' have an areal design and integrate the intensity over the whole cross-section of the ray detected in each case. A lock-in amplifier with differential input is used as the demodulator 50. To control the mirror 20 designed as a phase modulator, the modulator control 60 is used.

Figure 4:
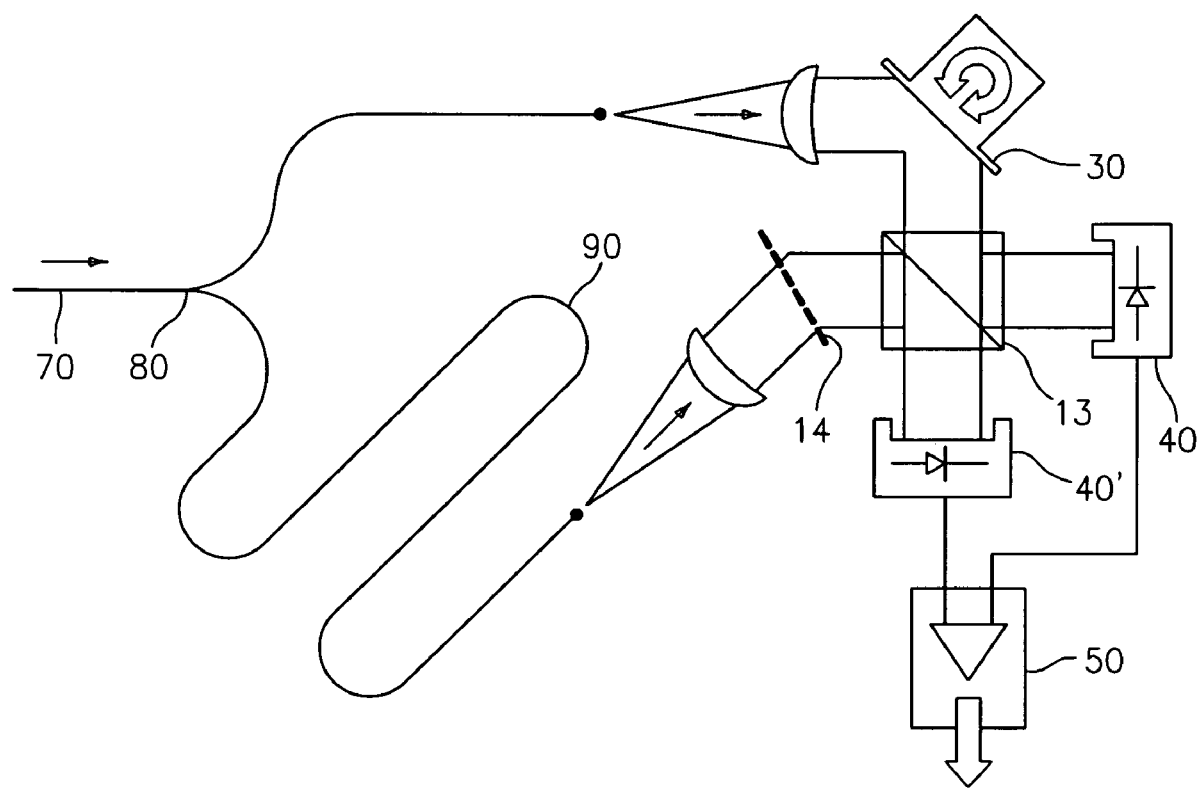
FIG. 4 shows a principle design of a device in accordance with the invention wherein one of the partial rays is delayed in time.
Figure 5:
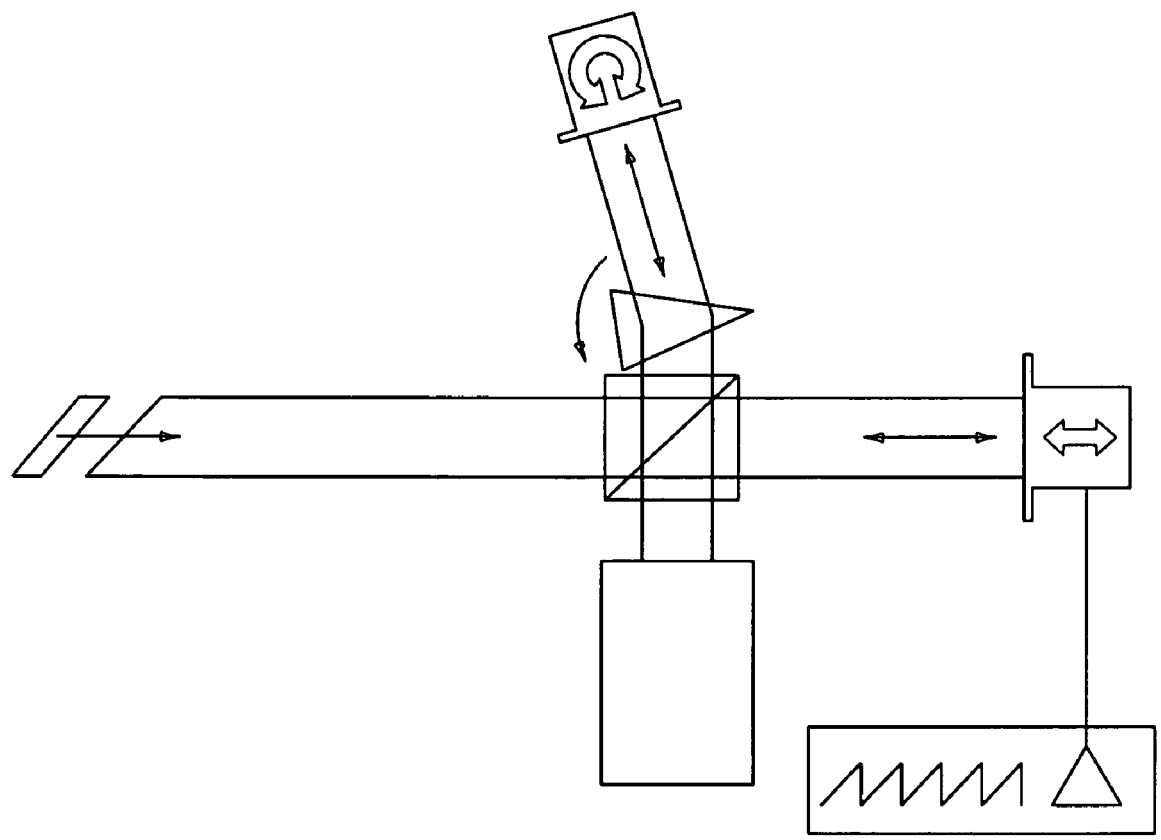
FIG. 5 shows a principle design of a device in accordance with the invention utilizing a coupler.

FIG. 4 shows the principle design of an embodiment of the device in accordance with the invention with a time shift between the reference and the signal rays. The change in the relative phase position between the partial rays is achieved by a time displacement of one of the partial rays (delay due to longer period), with a suitable phase modulation or frequency modulation of the signal being a pre-requisite in this case. The incident signal is guided through a glass fiber 70. The first beam splitter 80 is designed with means if fiber glass technology. One part of the signal is expanded after a short period and guided to the conventionally designed second beam splitter 13 via a mirror 30 pivoted in a suitable manner to select the wavelength to be detected. The other ray is delayed by a suitably sized travel distance 90, then expanded and guided to the second beam splitter 13 via the wavelength-dependent element 14 designed here a diffracting optical element. The partial rays brought to interference by the second beam splitter 13 (combiner) are detected by detectors 40, 40'. The detectors 40, 40' have an areal design and integrate the intensity over the whole cross-section of the ray detected in each case. The demodulator 50 is realized electronically and must have a varying design dependent on the modulation type of the signal.

The invention claimed is:

1. A device for detecting optical signals at a certain optical wavelength with a high resolution, the optical signals to be detected modulating an optical carrier having a freely selectable carrier wavelength, the device comprising:

means structured and arranged for generating at least one reference light ray, which is at least one of a frequency shifted, frequency modulated, phase shifted, phase modulated or time displaced relative to said optical carrier;

means (20, 30) structured and arranged for aligning said optical carrier modulated by the signals to be detected with said at least one reference light ray such that said at least one of the optical carrier modulated by the signals to be detected and said at least one reference light ray are brought to interference in such manner that the period of spatial modulation of a resulting spatial interference pattern occurring at a detector is larger than a detected portion of the resulting interference pattern detected by said detector; and a detector (40) with a demodulator (50) being structured and arranged to detect intensity modulation of a resulting signal from said interference;

wherein an angular dispersive element (11, 12, 14) is structured and arranged to change an angle of at least one of the optical signals and said at least one reference light ray being brought into interference depending upon wavelength; and said detector (40) is structured and arranged to measure a modulation of intensity of at least part of cross-section of the resulting detected signal.

2. A device in accordance with claim 1, wherein said angular dispersive element (11, 12, 14) is a diffracting optical element.

3. A device in accordance with claim 2, wherein said diffracting optical element is one of an optical grating (11, 14), a hologram, or a system of thin films.

4. A device in accordance with claim 1, wherein the angular dispersive element (12) is a dispersing optical element.

5. A device in accordance with claim 4, wherein said dispersing optical element is a prism (12).

6. A device in accordance with claim 1, wherein the angular dispersive element (11) is additionally structured and arranged to simultaneously function as one of a beam splitter (11) or a combiner in addition to being structured and arranged to change angles of said at least one of the optical signals and said at least one reference light ray.

7. A device in accordance with claim 1, wherein the angular dispersive element is one of a frequency shifter and/or frequency modulator or one of a phase shifter and/or phase modulator.

8. A device in accordance with claim 7, wherein the angular dispersive element is structured and arranged as an acousto-optical modulator.

9. A device in accordance with claim 1 additionally comprising one of a spectral filter or a spatial filter to suppress the detection of certain wavelengths or certain interference patterns by said detector.

10. The device in accordance with claim 1, additionally comprising at least one of a multiplex hologram structured and arranged for simultaneously handling multiple rays.

11. A device in accordance with claim 1, where the angular dispersive element (11, 12, 14) is structured and arranged to be at least one of rotatable or tiltable.

12. A device in accordance with claim 1, additionally comprising a plurality of wave guides structured and arranged such that at least one of said optical carrier or said at least one reference light ray is guided at least partially through said plurality of wave guides.

13. A device in accordance with claim 1, wherein said angular dispersive element is formed by integrated optics.

14. A device for generating optical signals by modulating an optical carrier at a freely selectable optical wavelength with high spectral resolution, the device comprising:
   means structured and arranged for generating at least one reference light ray, which is one of a frequency shifted, frequency modulated, phase shifted, phase modulated or time displaced reference light relative to said optical carrier and according to the signal to be modulated on said optical carrier;
   means structured and arranged for aligning said optical carrier with said at least one reference light ray such that said optical carrier to be modulated and said at least one reference light ray are brought to interference in such manner that a period of spatial modulation of a resulting interference pattern occurring at a coupler is larger than the coupled portion of the resulting interference pattern collected by said coupler;
   wherein an angular dispersive element is structured to change angles of at least one of the optical carrier and said reference light ray being brought to interference depending upon wavelength and
   the coupler being structured and arranged to collect a resulting signal from said interference and direct the signal to an optical transmission line.

15. A device in accordance with claim 14, wherein said generating means (10, 11, 20, 80) includes a beam splitter and a frequency shifter or modulator to generate the reference light ray which is one of frequency shifted, frequency modulated, phase shifted or phase modulated relative to said optical carrier.

16. A device in accordance with claim 15, wherein said generating means (10, 11, 20, 80) includes a local light source to generate the reference light ray.

* * * * *